(12) United States Patent
Paul

(10) Patent No.: US 7,891,465 B1
(45) Date of Patent: Feb. 22, 2011

(54) TREE STAND

(76) Inventor: Donald L. Paul, 9559 Hickory St. South, Foley, AL (US) 36535

( * ) Notice: Subject to any disclaimer, the term of this patent is extended or adjusted under 35 U.S.C. 154(b) by 679 days.

(21) Appl. No.: 12/004,312

(22) Filed: Dec. 20, 2007

(51) Int. Cl.
*A01M 31/00* (2006.01)
(52) U.S. Cl. ..................................... 182/136
(58) Field of Classification Search .............. 182/135, 182/136, 187, 188
See application file for complete search history.

(56) References Cited

U.S. PATENT DOCUMENTS

| | | | | |
|---|---|---|---|---|
| 5,097,925 A | * | 3/1992 | Walker, Jr. ............... | 182/135 |
| 5,588,499 A | * | 12/1996 | Carriere ..................... | 182/135 |
| 6,068,281 A | * | 5/2000 | Szczypski ................ | 280/479.2 |
| 7,802,654 B2 | * | 9/2010 | Tolliver et al. ............. | 182/136 |
| 2003/0132060 A1 | * | 7/2003 | Goodwin, Jr. ............. | 182/136 |

* cited by examiner

*Primary Examiner*—Alvin C Chin-Shue
(74) *Attorney, Agent, or Firm*—Charles M. Kaplan

(57) ABSTRACT

A tree climber's stand has at least one pin securing a tree encircling strand when the strand is being shortened or lengthened by a climber in order to level the tree stand. An anchoring block on an end of the strand has an elongated slot spanning more than one hole in the tree stand frame for receiving a pair of pins, one of which always extends through the slot to anchor the strand.

20 Claims, 5 Drawing Sheets

TREE STAND

BACKGROUND OF THE INVENTION

This invention relates to stands for people who climb trees, such as hunters, photographers and bird watchers. Often the diameter of a tree becomes smaller towards its top. After a person has moved a stand up into such a tree, it is necessary for him to shorten the portion of the cables used to hold the components of the stand on the tree in order to level the stand. Some prior tree stand leveling arrangements used single anchoring pins insertable into a hole to secure a cable to the frame of the stand. When the single pin anchoring the cable had been removed and the cable was being held by the tree climber, there was the risk that the cable would slip from the person's hand, which might result in the stand and tree climber falling out of the tree. Also, the tree climber had to try to align the cable end with holes while bearing the weight of the stand and holding an anchoring pin, sometimes in low light conditions or at night.

OBJECTIVES OF THE INVENTION

Accordingly, it is an object of this invention to provide an improved climber tree stand.

Another object is to improve the safety of tree stand leveling arrangements.

An additional object is to provide a tree stand cable with an anchoring mechanism that always has at least one pin securing the cable in the stand.

Another object is to coat a tree stand cable anchoring block with highly visible plastic to facilitate alignment of the anchoring block with holes for anchoring pins.

A further object is to dampen the noise made by tree climbers by coating parts with plastic so as to eliminate metal-to-metal contact.

An additional object is to make a simple pin and cable block leveling combination foolproof by using a cable leveling block that always has at least one pin inserted through it.

A further object is to provide climbing tree stands that are rugged, economical, comfortable, easy to use, fail-safe and which do not possess defects found in similar prior art climbing aids.

Other objects and advantages of a tree stand incorporating this invention will be found in the specification and claims and the scope of the invention will be set forth in the claims.

DESCRIPTION OF THE INVENTION

Figure 1:
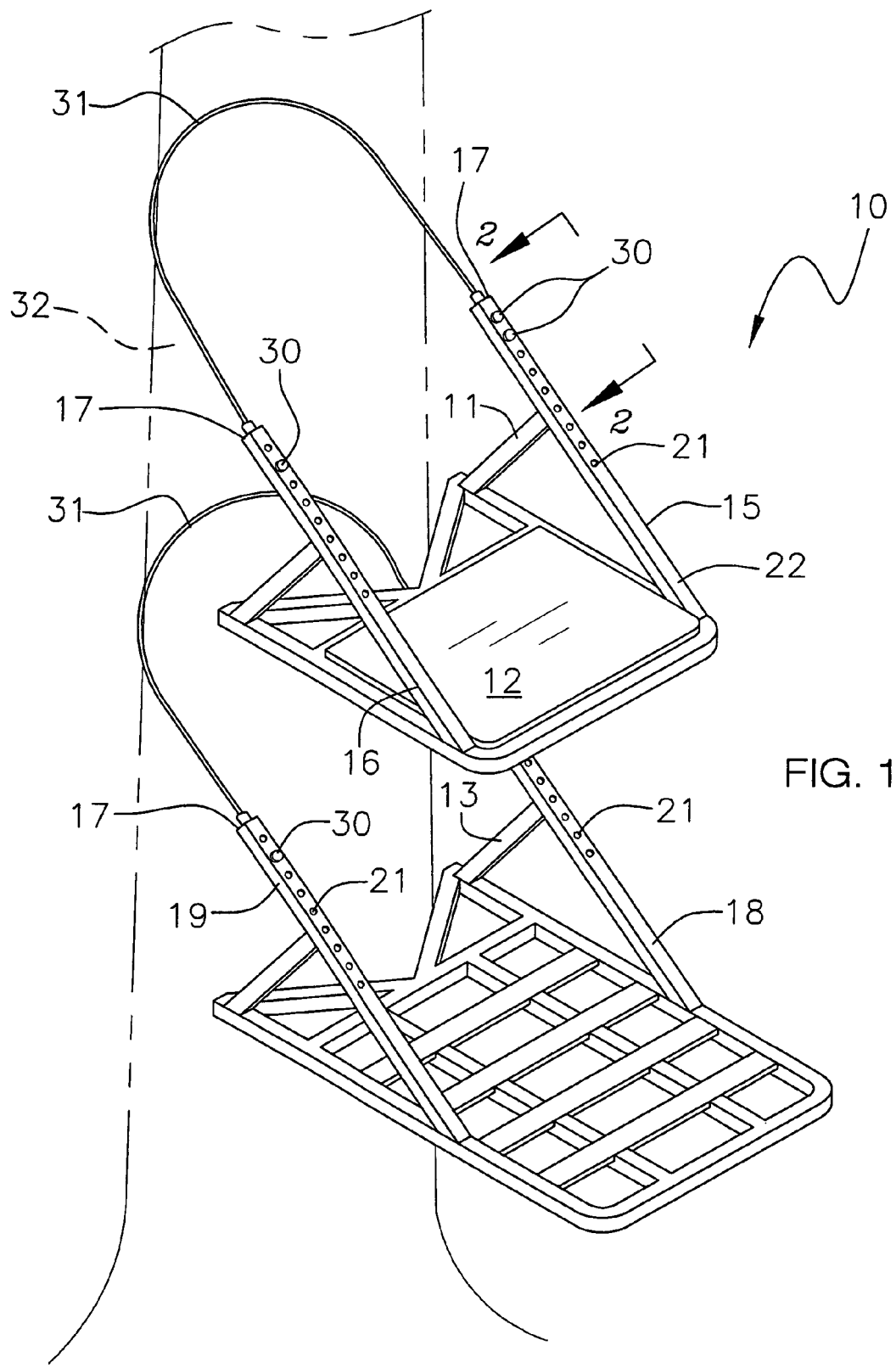
FIG. 1 is a perspective view of an embodiment of a tree stand in accord with this invention.

The drawing shows a tree stand 10 in accord with this invention having an upper platform 11 with a removable seat cushion 12 and a lower platform 13. Platform 11 is constructed from identical, hollow frame members 15 and 16, each having one open end 17 that exposes the hollow interior 14 thereof. Platform 13 is constructed from identical, hollow frame members 18 and 19 that are the same as frame members 15 and 16 in all aspects relating to this invention. All frame members are generally rectangular and square in cross section, and may be made from a lightweight metal such as aluminum.

Each frame member has a plurality of uniformly spaced, identical circular holes 21 through its upper surface 22 that communicate with its hollow interior. A plurality of mating, or additional, holes 23 exactly matching and identical to the holes 21 pass through the frame lower surface 24 in axial alignment with the holes 21.

Since the location and spacing of the holes in each frame member are identical, only the holes 21 in frame 15 will be described, and since the frame members 18 and 19 are essentially identical to frame members 15 and 16, only the cable connections to frame members 15 and 16 will be described.

Figure 2:
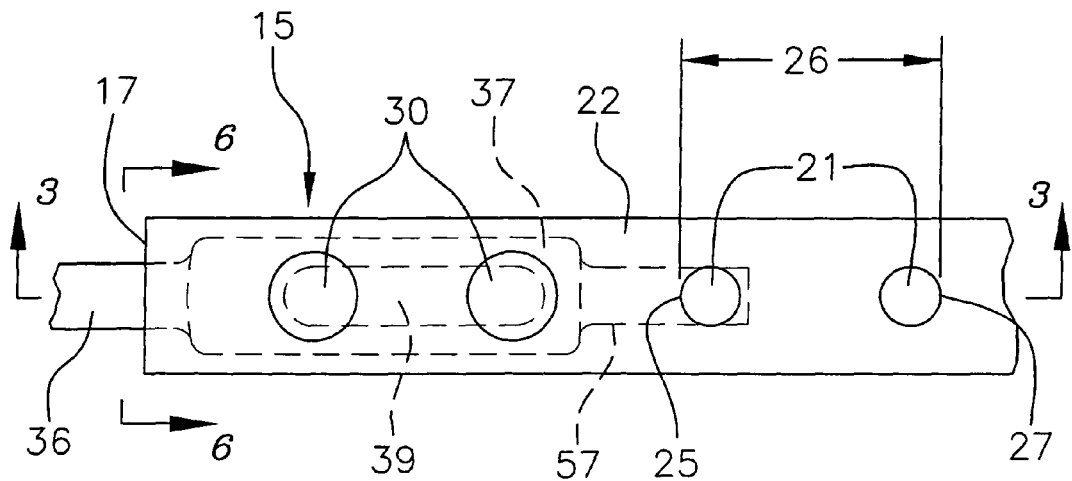
FIG. 2 is top view taken generally along the line 2-2 in FIG. 1.

As shown in FIG. 2, the front end 25 of each hole 21 is the same predetermined distance 26 from the back end 27 of its next most adjacent hole. To simplify the disclosure and claiming of this invention, the hole 21 in any pair of adjacent holes that is closest to the open end 17 its frame member 15 will be identified as the first hole of such pair of adjacent holes, and the hole 21 that is farther from the open end of the frame member will be identified as the second hole of such pair of adjacent holes.

A pair of identical flat-headed, cylindrical pins 30 are dimensioned to slide through the holes 21 into the hollow interior 14 and out through the mating holes 23. The pins may be coated with a sound deadening plastic.

An elongated flexible cable 31 made from multiple braided wire strands may be used for encircling a tree trunk 32 in well-known manner to hold the platforms 11 and 13 against the tree. The ends of the cable 31 are removably connected to the frame members 15 and 16. The cable ends are slidable into and through the open ends 17 and hollow interiors 14 of the frame members 15 and 16 to enable a climber to level the frame as the climber moves up or down in a tree. Other types of elongated flexible components or strands, such as straps or chains may be used instead of cables to hold the tree stand frames against a tree.

A first end 35 of cable 31 is secured, by welding, crimping or bonding with an adhesive such as Loctite, into an integral tubular cylindrical extension 36 at one end of an elongated, generally rectangular leveling block 37 that may be made from a metal such as aluminum. Block 37 is generally square in cross section in that its sides are of equal length and is dimensioned to slide through the hollow interior 14 of the frame members 15 and 16. Block 37 may have beveled or rounded corners and ends to prevent jamming inside a frame member. Block 37 is significantly longer than the distance separating any two holes 21 from each other, and is coated with a high visibility plastic material 38. An elongated slot 39 in block 37 is wider than the diameter of the pins 30 and has beveled upper and lower edges 40 to facilitate entry and removal of the pins. Slot 39 has a first end 41 and a second end 42 that are separated by a distance that is slightly longer than the predetermined distance 26 separating the front end 25 of any hole 21 from the back end 27 of its next most adjacent hole; this enables the pair of pins 30 to both be inserted at the same time into any two adjacent first and second holes 21 in a frame member. To simplify the explanation and claiming of this invention, the pin in a first hole will be said to be a first pin, and the pin in the second hole will be said to a second pin.

Figure 3:
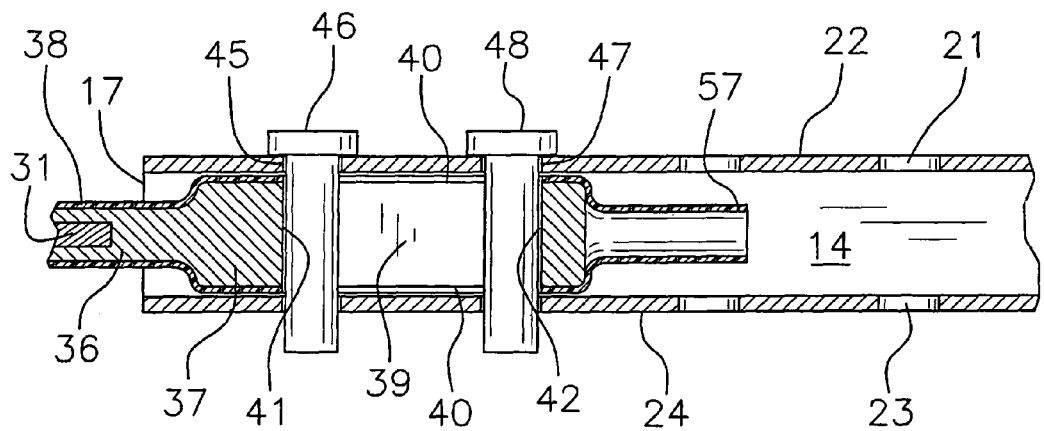
FIG. 3 is a cross sectional view taken along the line 3-3 in FIG. 2.
Figure 4:
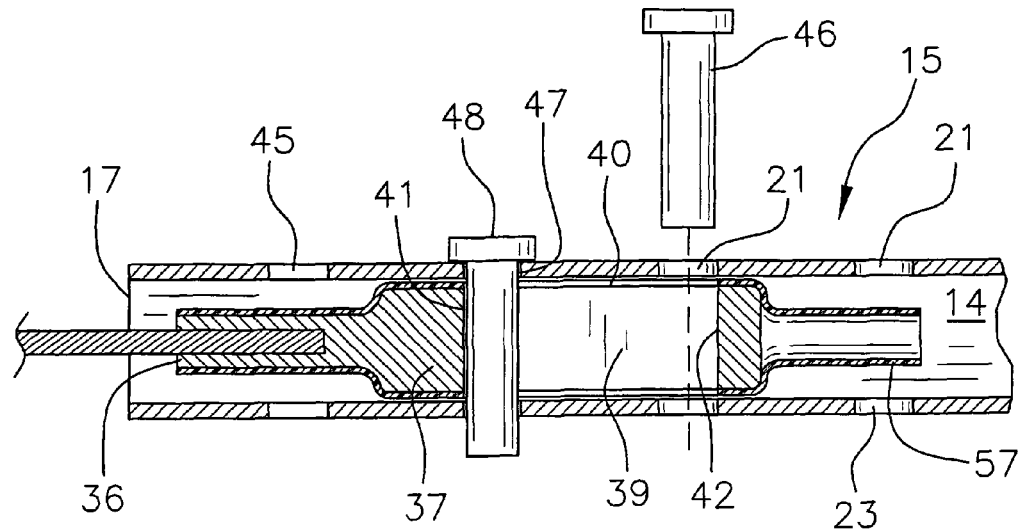
FIG. 4 is a cross sectional view corresponding to FIG. 3 showing the parts moved to level the stand with one pin in place.
Figure 5:
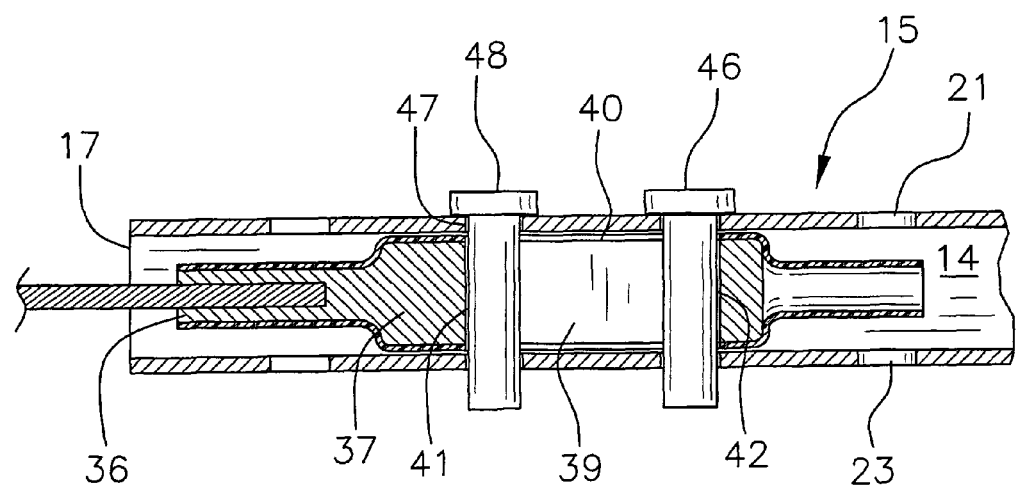
FIG. 5 is a cross sectional view corresponding to FIG. 4 showing the second pin in place.
Figure 6:
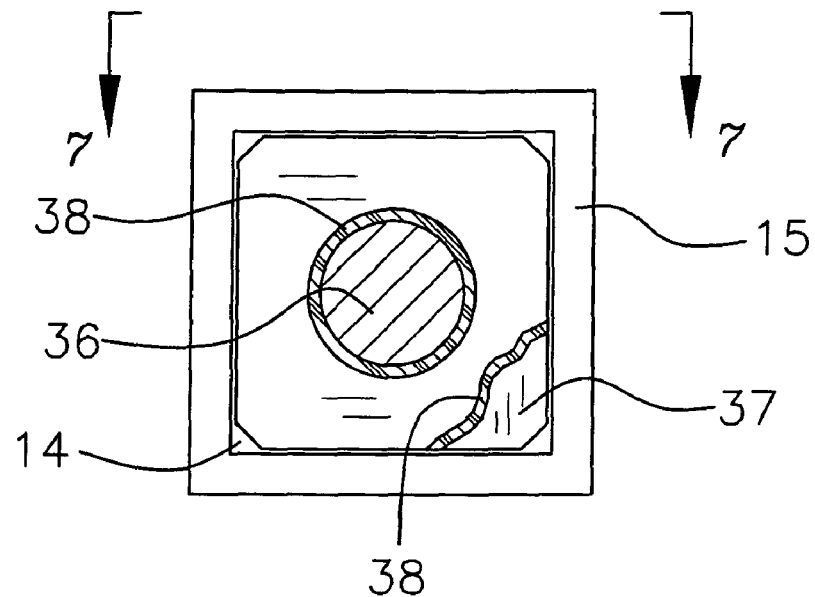
FIG. 6 is an enlarged end view of taken along the line 6-6 in FIG. 2
Figure 7:
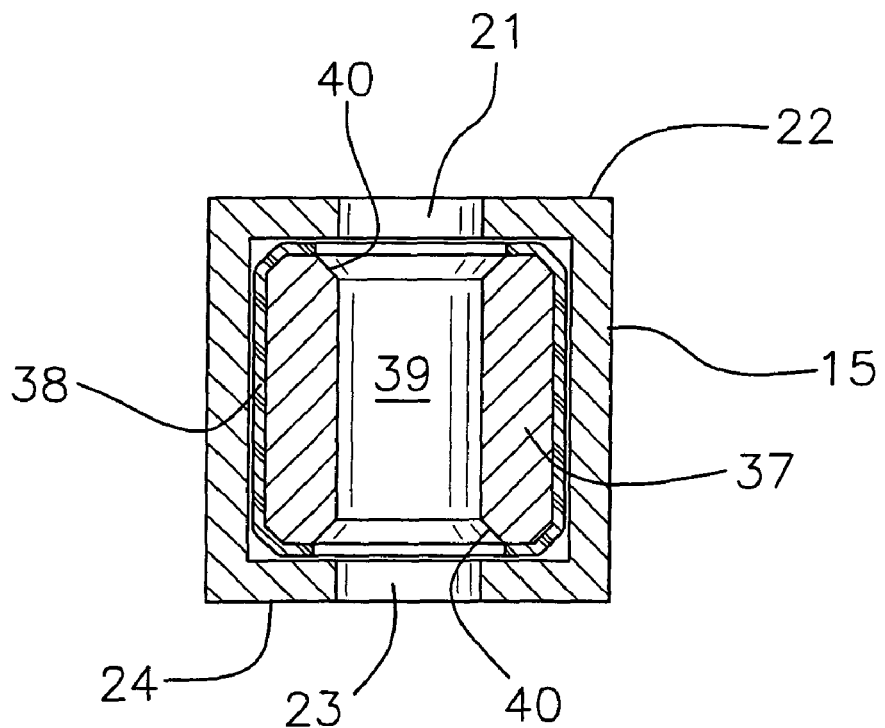
FIG. 7 is an enlarged cross sectional view taken along the line 7-7 in FIG. 6.
Figure 8:
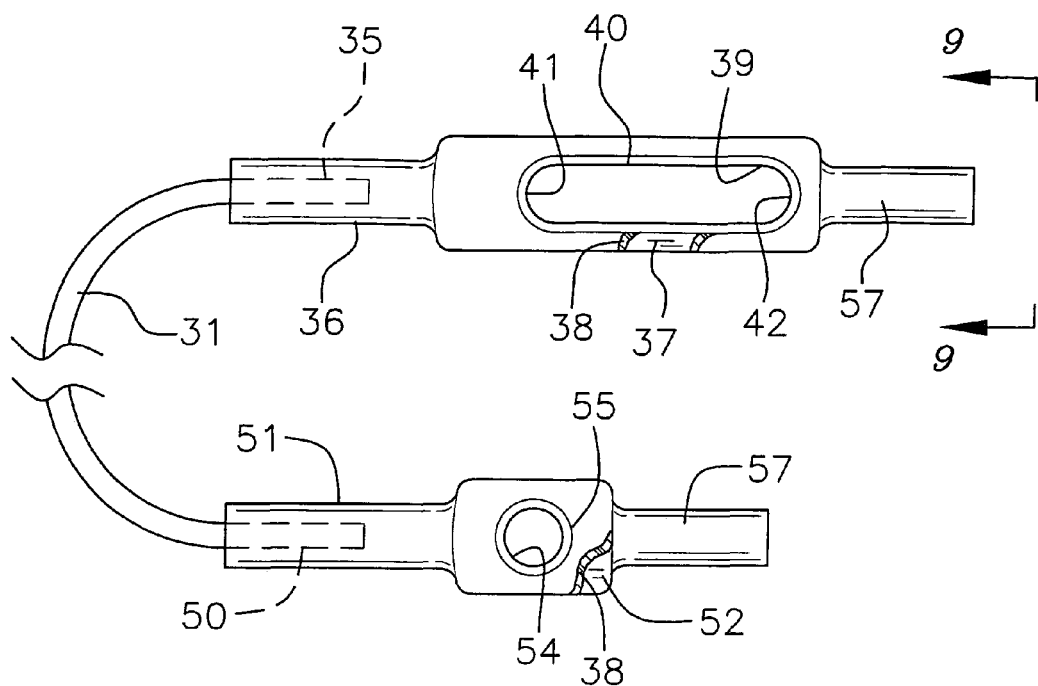
FIG. 8 is a top plan view of the cable and blocks.
Figure 9:
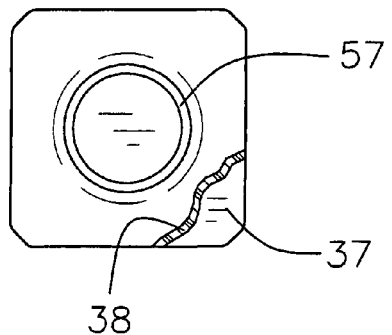
FIG. 9 is an end view taken along the line 9-9 in FIG. 8.

When leveling of one of the platforms 11 or 13 requires shortening the effective length of the cable 31 surrounding a tree, the steps illustrated in FIGS. 3-5 may be safely taken without the risk of a platform or climber falling if the cable end slips out of a climber's grasp. As shown in FIG. 3, the hole 21 closest to the open end 17 of frame member 15 has been identified as a first hole 45 of a pair of an adjacent pair of holes 21 and the pin in the first hole has been identified as a first pin 46. The hole of this pair of adjacent holes that is farther from the frame open end 17 has been identified as the second hole 47 of this pair, and the pin in the second hole has been identified as the second pin 48. The first end 41 of slot 39 is in contact with or closely adjacent first pin 46 and second end 42 of slot 39 is in contact with or closely adjacent second pin 48.

As shown in FIG. 4, the first step in shortening the length of cable 31 surrounding a tree is removal of first pin 46 from first hole 45 and pulling on cable 31 so as to slide block 37 farther inside of frame 15 until the first end 41 of the slot 39 is in contact with second pin 48 and the second end 42 of the slot is positioned beneath the hole 21 next farther from the open end 17 of the frame 15. If the cable 31 slips from the climber's grasp at the time, the second pin 48 will prevent the cable from sliding out of the frame 15 and the platform or climber from falling. As shown in FIG. 5, the cable shortening operation is completed when the pin 46 has been inserted into the next adjacent hole shown as exposed over the slot 39 in FIG. 4. These steps of removing one pin 30, sliding the block 37 farther into the frame 15, and inserting the removed pin into a more distant hole 21 may be safely repeated until the cable has been shortened enough to level the tree stand platform. The order of these steps would be reversed if the climber found it necessary to increase the length of a cable 31 that surrounds a tree.

A second or opposite end 50 of cable 31 is secured, by welding, crimping or bonding with an adhesive such as Loctite, into a tubular cylindrical extension 51 integral with one end of a shorter, generally rectangular block 52 that may be made from a metal such as aluminum. Block 52 is generally square in cross section and is dimensioned to slide through the hollow interior 14 of the frame members 15 and 16. Block 52 may have beveled or rounded corners and ends to prevent jamming inside a frame member and is coated with the same high visibility plastic material 38 as the block 37. A single circular hole 54 dimensioned to receive a pin 30 that passes through aligned holes 21 and 23 and through the center of this block, for connecting and anchoring the opposite end 50 of the cable to a frame member of a platform in the same manner shown and described above. The top and bottom of hole 54 may be beveled at 55 to ease entry and removal of a pin.

It is also possible to employ a second leveling block identical to the block 37 instead of the shorter block 52, in which case both ends 35 and 50 of cable 31 would be secured to a leveling block 37. This will give tree climbers the ability to level a tree stand from both sides of the stand and more capacity for shortening cable 31.

The highly visible plastic 38 material coating blocks 37 and 52 is applied to the tubular extensions 36 and 51 at the ends 35 and 50 of the cable 31 for a distance longer than the predetermined distance 26, and the plastic coating 38 may be continued beyond the opposite end of blocks 37 and 52 as hollow tubes 57 for a distance longer than the distance 26.

These extensions 36, 51 and 57 of the highly visible plastic can be seen through the holes 21, which will identify the holes that are closed off by the blocks 37 and 52. This aids climbers in aligning the slot 39 and hole 54 with unobstructed holes 21 in low light conditions by visibly indicating and blocking the unopen holes. The coating 38 also dampens sound by eliminating metal-to-metal contact between the blocks and frames.

A cable 31 with a block 37 and pins 30 may be used to safely hold and level platform 13 in a tree in the same manner described above with respect to platform 11.

While the present invention has been described with reference to a particular embodiment, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. A tree stand comprising:

a platform having a hollow tubular frame member, one end of said tubular frame member being open so as to expose the hollow interior thereof, there being a plurality of holes through one surface of said tubular frame member communicating with its hollow interior, each of said holes having the same size, and said holes being uniformly spaced the same distance from each other so that a front end of each hole is a same predetermined distance from a back end of its next most adjacent hole, and the hole of any pair of adjacent holes that is closest to said open end of said tubular frame member being designated as a first hole and the hole of such pair of adjacent holes that is farther from said open end being designated as a second hole;

a plurality of pins dimensioned to slide through said holes into and out of the interior of said tubular frame member;

an elongated flexible component for encircling the trunk of a tree and holding said tree stand against the tree; a first end of said flexible component being slidable into said open end of said tubular frame member and through said tubular frame member for leveling said frame as a climber moves up or down a tree, an opposite end of said flexible component being connected to said frame of said tree stand;

a block secured to said first end of said flexible component for holding and leveling said frame, said block being dimensioned to slide through said tubular frame member, said block being longer than said distance spacing said holes from each other, there being an elongated slot in said block having a first end and a second end, said elongated slot being at least as long as said predetermined distance spacing the front end of each hole of any pair of adjacent holes from the back end of its next most adjacent hole so that a pair of said pins are insertable at the same time into two adjacent first and second holes in said tubular frame member, said first hole having a first pin therein and said second hole having a second pin therein; and removal of said first pin from said first hole of a pair of adjacent holes enabling a tree climber to level said tree stand by sliding the block through said tubular frame member until said first end of said elongated slot contacts said second pin and at the same time aligns said second end of said elongated slot with the next hole adjacent to said second hole for insertion of said first pin thereinto, whereby at least one of said pins extends through said tubular frame member and into said flexible component block at all times so as to prevent accidental falling of said tree stand.

2. The tree stand defined in claim 1, further comprising said hollow tubular frame member being generally rectangular.

3. The tree stand defined in claim 1, further comprising said block being essentially rectangular.

4. The tree stand defined in claim 1, further comprising said frame member and said block being generally square in cross section.

5. The tree stand defined in claim 1, further comprising there being a plurality of additional holes exactly matching the first mentioned holes through an opposite surface of said tubular frame member, said additional holes being axially aligned with said first mentioned holes so that each pin is insertable into a pair of axially aligned holes.

6. The tree stand defined in claim 1, further comprising said elongated flexible component being a multi-stranded cable.

7. The tree stand defined in claim 1, further comprising said holes through said tubular frame member being circular.

8. The tree stand defined in claim 1, further comprising said pins being cylindrical.

9. The tree stand defined in claim 1, further comprising a colorful plastic material coating said block, said plastic material protruding beyond said block for a distance greater than said distance uniformly spacing said holes apart, so that said plastic material is visible through said holes to aid tree climbers in aligning said slot with open holes.

10. A tree stand comprising:
a platform having a rectangular hollow tubular frame member, one end of said tubular frame member being open so as to expose the hollow interior thereof, there being a plurality of circular holes through one surface of said tubular frame member communicating with its hollow interior, each of said holes having the same size, and said holes being uniformly spaced the same distance from each other so that a front end of each hole is a same predetermined distance from a back end of its next most adjacent hole, and a hole of any pair of adjacent holes that is closest to said open end of said tubular frame member being designated as a first hole and a hole of such pair of adjacent holes that is farther from said open end being designated as a second hole;
a pair of cylindrical pins dimensioned to slide through said holes into and out of the interior of said tubular frame member;
an elongated flexible cable for encircling the trunk of a tree and holding said tree stand against the tree; a first end of said flexible component being slidable into said open end of said tubular frame member and through said tubular frame member for leveling said frame as a tree climber moves up or down a tree, an opposite end of said cable being connected to said frame of said tree stand;
a generally rectangular leveling block secured to said first end of said cable for holding and leveling said stand, said leveling block being dimensioned to slide through said tubular frame member, said leveling block being longer than said distance spacing said holes from each other, there being an elongated slot in said leveling block having a first end and a second end, said elongated slot being at least as long as said predetermined distance spacing the front end of each hole of any pair of adjacent holes from the back end of its next most adjacent hole so that said pair of pins are insertable at the same time into two adjacent first and second holes in said tubular frame member, said first hole having a first pin therein and said second hole having a second pin therein; and removal of said first pin from said first hole of a pair of adjacent holes enabling a tree climber to level said tree stand by sliding the block through said tubular frame member until said first end of said elongated slot contacts said second pin and at the same time aligns said second end of said elongated slot with the next hole adjacent to said second hole for insertion of said first pin thereinto, whereby at least one of said pins extends through said tubular frame member and into said block at all times so as to prevent accidental falling of said tree stand.

11. The tree stand defined in claim 10, further comprising there being a plurality of additional holes exactly matching the first mentioned holes through an opposite surface of said tubular frame member, said additional holes being axially aligned with said first mentioned holes so that each pin is insertable into a pair of axially aligned holes.

12. The tree stand defined in claim 11, further comprising said hollow tubular frame member and said leveling block being generally square in cross section.

13. The tree stand defined in claim 11, further comprising a colorful plastic material coating said leveling block, a tubular extension of said plastic material protruding beyond each end of said leveling block for a distance greater than said distance uniformly spacing said holes apart, so that said plastic material is visible through said holes to aid a climber in aligning said slot with said holes.

14. The tree stand defined in claim 11, further comprising said opposite end of said cable being connected to said frame of said tree stand by pins and a leveling block identical to the first mentioned leveling block which has been secured to said opposite end of said cable for holding and leveling said platform.

15. A tree stand comprising:
a platform having a hollow tubular frame member, one end of said tubular frame member being open so as to expose the hollow interior thereof, there being a plurality of holes through one surface of said tubular frame member communicating with its hollow interior, each of said holes having the same size, and said holes being uniformly spaced the same distance from each other so that a front end of each hole is a same predetermined distance from a back end of its next most adjacent hole, additional holes exactly matching the first mentioned holes through an opposite surface of said tubular frame member, said additional holes being axially aligned with said first mentioned holes, and the hole of any pair of adjacent holes that is closest to said open end of said tubular frame member being designated as a first hole and a hole of such pair of adjacent holes that is farther from said open end being designated as a second hole;
a plurality of pins dimensioned to slide through said aligned holes into and out of the interior of said tubular frame member;
an flexible cable for encircling the trunk of a tree and holding said platform against the tree; a first end of said cable being slidable into said open end of said tubular frame member and through said tubular frame member for leveling said platform as a tree climber moves up or down a tree, an opposite end of said cable being connected to said frame of said tree stand;
an enlarged block secured to said first end of said cable for holding and leveling said platform, said enlarged block being dimensioned to slide through said tubular frame member, said enlarged block being longer than said distance spacing said holes from each other, there being an elongated slot in said enlarged block having a first end and a second end, said elongated slot being at least as long as said predetermined distance spacing the front end of each hole of any pair of adjacent holes from the back end of its next most adjacent hole so that a pair of said pins are insertable at the same time into two adjacent first and second holes in said tubular frame member, said first hole having a first pin therein and said second hole having a second pin therein;

a colorful plastic material coating said enlarged block, an extension of said plastic material protruding beyond said enlarged block for a distance greater than said distance uniformly spacing said holes apart, so that said plastic material is visible through said holes to aid a climber in aligning said slot and said pins with open holes; and removal of said first pin from said first hole of a pair of adjacent holes enabling a tree climber to level said tree stand by sliding the enlarged block through said tubular frame member until said first end of said elongated slot contacts said second pin and at the same time aligns said second end of said elongated slot with the next hole adjacent to said second hole for insertion of said first pin thereinto, whereby at least one of said pins extends through said tubular frame member and into said enlarged block at all times so as to prevent accidental falling of said platform.

16. The tree stand defined in claim 15, further comprising said hollow tubular frame member and said enlarged block being generally leveling.

17. The tree stand defined in claim 16, further comprising said frame member and said enlarged block being generally square in cross section.

18. The tree stand defined in claim 15, further comprising said holes through said tubular frame member being circular and said pins being cylindrical.

19. The tree stand defined in claim 15, further comprising an integral cylindrical tubular extension projecting from one end of said enlarged block, and said first end of said cable extending into said integral tubular extension and being secured to said enlarged block therein.

20. The tree stand defined in claim 15, further comprising said opposite end of said cable being connected to said frame of said tree stand by pins and an enlarged block identical to the first mentioned enlarged block which has been secured to said opposite end of said cable for holding and leveling said platform.

* * * * *